3,405,216
METHOD FOR MAKING POROUS POLYURETHANE FOAMS

Walter L. Garrett, Freeland, and Harold H. Roth, Bay City, Mich., assignors to The Dow Chemical Company, Midland, Mich., a corporation of Delaware
No Drawing. Filed Mar. 30, 1964, Ser. No. 355,931
4 Claims. (Cl. 264—321)

This invention relates to the preparation of low density flexible polyurethane foams and pertains especially to a method for making open cell flexible polyurethane foam suitable for use as filters for fluids to remove solid material entrained therein.

It is known to modify or change the physical properties of open-cell, cellular structures of foamed polymeric polyester polyurethanes by the partial saponification of the foam with hydrolytic saponification reagents and under conditions commonly used for hydrolyzing carboxylic esters in general, to convert the polyurethane foam from a relatively hard cellular structure to a foam of increased softness, capillaractivity, hydrophilicity and of decreased density.

It is also known to violently agitate a sheet of polyurethane foam by mechanical means to increase the number of interconnecting cells or voids, or to crush the dry foam by alternate squeezing and expanding action to rupture the cell walls or membranes, leaving principally the skeletal structure, and form a product suitable for use as a filter for fluids.

It has now been discovered that flexible polyether polyurethane open cell foams can readily be converted to foams of greater porosity or of improved breathability, together with increased softness, by treating the foam with an aqueous basic, neutral or acidic solution of an inorganic oxidizing salt selected from the group consisting of potassium permanganate and ceric sulfate, as hereinafter defined, whereby the membranes of the cells, being of relatively thinner section, are preferentially destroyed, leaving largely a skeletal network of the foam structure, to produce polyether polyurethane foam products of high porosity, and useful for a variety of purposes in the home and industry, e.g. as filters for fluids to remove solid materials entrained therein.

The polyether polyurethane foam or sponge starting material can be any open-cell flexible polyether urethane sponge formed by reaction of a polyether polyol having an OH equivalent weight between about 600 and 1800, with a polyisocyanate. Methods of making flexible open cell urethane foams are well known and need not be discussed in detail. The urethane foam starting material is preferably a flexible open-cell polyoxyalkylene glycol ether polyol-polyisocyanate reaction product.

Among suitable polyols are the polypropylene glycols and adducts of polyhydric compounds such as glycerine, sorbitol, pentaerythritol or hexane triol with propylene oxide, or with a mixture of propylene and ethylene oxides, which polyglycols and polyether polyols have a molecular weight within the range of from about 1800 to 5800.

Among suitable polyisocyanates that can be used to make the polyurethane foams there may be mentioned 2,4-toluene diisocyanate, 2,6-toluene diisocyanate, metaphenylene diisocyanate, 1-chlorophenylene-2,4-diisocyanate, naphthalene-1,5-diisocyanate, hexamethylene diisocyanate, polymethylene polyphenyl isocyanate having an NCO content of about 31 percent by weight, or mixtures of any two or more of the polyisocyanates.

A general method of making the urethane foam is by reaction of a polyisocyanate with a polyol to produce a prepolymer. The prepolymer is then foamed by reaction with water and an amine catalyst. The urethane foam can be produced by the so-called one-step process wherein the polyisocyanate, the polyol, catalyst, and a silicone fluid, and water, or water and a volatile alkane, or haloalkane, foming agent are blended together in a mixing chamber in the desired proportions, under pressure, then are discharged and allowed to foam to a flexible resilient open-cell product.

The flexible foam product is leached or treated by contacting it with an aqueous basic neutral or acidic solution of potassium pregmanganate or an acidic solution of ceric sulfate to destroy the membranes of the cells leaving a skeletal network of the foam product that has increased softness, flexibility, resiliency and porosity.

The pH of the aqueous potassium permanganate solution can readily be adjusted by adding an alkali metal hydroxide or an aqueous solution of an alkali metal hydroxide thereto, or an acid or an aqueous solution of an inorganic acid, e.g. sulfuric acid.

The foam can be contacted with the aqueous solution of the inorganic salt at temperatures between about $-10°$ C. and $120°$ C., but is usually carried out at from about room temperature up to about $80°$ C. and at atmospheric or substantially atmospheric pressure.

The inorganic salt can be used in a concentration of from about 0.1 percent by weight up to a saturated aqueous solution of the same, but is preferably employed as an aqueous solution containing from 0.1 to 10 percent by weight of the salt.

The time for which the foam is treated or subjected to contact with the salt solution will vary depending in part upon the concentration of the solution and in part upon the temperature and pH of the solution, and in part upon the size of the cells in the foam being treated. It is understood, of course, that prolonged treatment of the urethane foam with the oxidizing salt solution may completely destroy the foam structure including the skeletal network of the cells. The invention contemplates the destroying of the membranes of the cell walls while retaining the skeletal network structure of the cells and without substantial deterioration of the latter. Some deterioration of the skeletal network occurs, but being of greater cross-section than the cell membranes the latter are destroyed before appreciable deterioration of the skeletal network occurs.

It may be mentioned that where necessary, it is often advantageous to crush the urethane foam by squeezing it between rolls to rupture the cell walls of any closed cells, thereby making it easier for the salt solution to penetrate and contact the cell membranes in the foam body.

Following the treating of the foam with the oxidizing salt solution and the destroying of the cell membranes, the treated foam is washed with water or it may be treated with a swelling solvent such as ketone or lower aliphatic alcohol, e.g. acetone, methyl ethyl ketone, methyl isobutyl ketone, methyl alcohol, isobutyl alcohol, ethyl alcohol, butyl alcohol, or mixtures of one or more of such ketones and/or alcohols and/or water, after which the foam product is washed with water and is dried.

The following examples illustrate ways in which the

EXAMPLE 1

(A) In each of a series of experiments, a flexible open cell polyether urethane foam was prepared by reaction of tolylene diisocyanate with a polyol consisting of the condensation reaction product of propylene oxide and glycerine to foam a polyether polyol, i.e. a triol, having an average molecular weight of about 3500, employing a recipe and procedure as follows:

| Ingredient | Parts by weight | |
|---|---|---|
| | A | B |
| Triol (mol wt. 3500) | 100 | 100 |
| Tolylene diisocyanate | 88.8 | 88.8 |
| Water | 3.5 | 3.5 |
| Triethylenediamine | 0.1 | 0.1 |
| Stannous Octoate | 0.4 | 0.3 |
| Trichlorofluoromethane | 15 | 15 |
| Xylene | 3 | 3 |

In each of the experiments A and B the ingredients were blended together in a mixing zone in a one-shot process under a pressure of about 30 pounds per square inch gauge pressure at room temperature. The resulting mixture was immediately discharged from the mixing zone via a nozzle into an open mold wherein it was allowed to foam and was aged at room temperature for a period of 24 hours. Test pieces, free from external skin, were cut from the foam bun. The foam was examined for cell size and for porosity. The procedure for determining the cell size was to observe the cut surface of the foam under a magnifying glass and count the number of cells in a one inch length of the surface in two directions at right angles to one another. The number of cells per inch is reported as the average for at least two measurements. The procedure for determining the porosity of the foam was to place a 1.5 inch diameter test piece of the foam one inch thick against a coarse screen in the end of a 1.5 inch internal diameter tube and pull air at room temperature through the test piece of foam at a pressure differential of 1 inch of water, while measuring the rate of flow of air through the foam in cubic feet per minute. The polyether urethane foams had the properties:

| | A | B |
|---|---|---|
| Cells number per inch | 40 | 30 |
| Air flow cu.ft./min | 2.69 | 4.17 |

(B) In each of a series of experiments, a piece of the foam prepared in part A above was leached by suspending it in an aqueous acidic or basic solution of potassium permanganate in a concentration and for a time as stated in the following table. Thereafter, the foam was removed from the solution and was thoroughly washed with water and was dried. Table I identifies the experiments and gives the concentration and acidic or basic leach solution used. The table also gives the porosity of the leached foam.

TABLE I

| Run No. | Aqueous Solution, kind | $KMnO_4$, percent | Time, hrs. | Weight loss, percent | Air flow, cu.ft./min. |
|---|---|---|---|---|---|
| 1 | | | | | 2.68 |
| 2 | 0.5-N NaOH | 2.5 | 1 | [1]1 | 4.57 |
| 3 | 0.5-N NaOH | 2.5 | 3.5 | 0 | 7.06 |
| 4 | 1-N NaOH | 4.5 | 5 | 19.6 | 10.9 |
| 5 | Neutral | 0.5 | 6 | [1]1.5 | 8.76 |
| 6 | | | | | 4.17 |
| 7 | 0.1-N $H_2SO_4$ | 0.5 | 0.33 | 15 | 9.7 |
| 8 | 0.1-N $H_2SO_4$ | 0.5 | 0.67 | 18.75 | 9.8 |

[1] Gain in weight.

EXAMPLE 2

A flexible open cell polyether urethane foam similar to foam as prepared in Example 1, having a porosity of 2.68 cu. ft./min. of air, was leached by suspending the foam in an aqueous 5 weight percent solution of ceric sulfate in a 0.1 normal sulfuric acid solution at room temperature for a period of 20 hours. Thereafter, the foam was removed from the solution and was thoroughly washed with water and was dried. The leached foam had a porosity corresponding to a rate of flow of 8.1 cubic feet of air per minute.

We claim:
1. A method for making an open cell polyurethane product which comprises contacting a flexible polyether polyurethane foam prepared by reaction of a polyether polyol consisting predominantly of chemically combined propylene oxide units and having a molecular weight between about 1800 and 5800 and containing from 2 to 3 hydroxyl groups in the molecule, and a polyisocyanate with an aqueous liquid solution of an inorganic salt selected from the group consisting of solutions of potassium permanganate and solutions of ceric sulfate, made acidic with sulfuric acid having a concentration of said salt between about 0.1 weight percent and a saturated solution of said salt at temperatures between −10° and 120° C. for a time sufficient to appreciably increase the porosity of the foam by destroying membranes of the cells while leaving largely a skeletal network of the foam structure.

2. A method as claimed in claim 1, wherein the inorganic salt is ceric sulfate.

3. A method as claimed in claim 1, wherein the potassium permanganate is made acidic with sulfuric acid.

4. A method as claimed in claim 2, wherein, the ceric sulfate solution is made acidic with sulfuric acid.

References Cited

UNITED STATES PATENTS

| 3,125,541 | 3/1964 | Hwa et al. | 260—2.5 |
| 3,171,820 | 3/1965 | Volz | 260—2.5 |
| 3,175,030 | 3/1965 | Geen | 264—2.5 |

FOREIGN PATENTS

| 543,362 | 12/1954 | Belguim. |
| 918,495 | 2/1963 | Great Britain. |

DONALD E. CZAJA, *Primary Examiner.*

M. B. FEIN, *Assistant Examiner.*